UNITED STATES PATENT OFFICE.

MAX KUGEL, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

VAT DYE.

994,756.     Specification of Letters Patent.     Patented June 13, 1911.

No Drawing.     Application filed November 16, 1910. Serial No. 592,656.

*To all whom it may concern:*

Be it known that I, MAX KUGEL, doctor of philosophy, chemist, citizen of the German Empire, residing at Leverkusen, near Cologne, Kingdom of Prussia, Germany, have invented a New Vat Dye, of which the following is a specification.

My present application concerns the manufacture and production of a new vat dyestuff which is obtained by condensing one molecule of 2-amino-1.3-dibromoanthraquinone with 2-methylamino-1.3-dibromoanthraquinone. A monomethylindanthrene is thus obtained in accordance with the following equation:

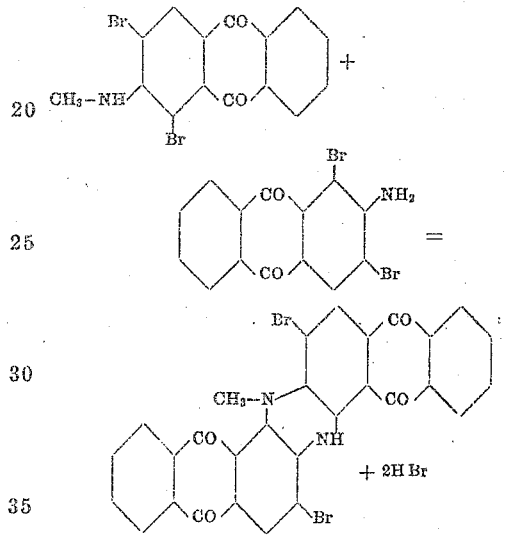

The new dye is after being dried and pulverized a blue crystalline powder soluble in boiling nitrobenzene with a blue color; soluble in concentrated sulfuric acid with a brown color; being transformed into a hydro compound on suitable reduction with hydrosulfite and caustic soda lye, the alkaline solution thus obtained exhibiting the typical properties of a "vat", which dyes the fiber pure green-blue shades.

In order to illustrate the new process more fully the following example is given, the parts being by weight:—15 parts of 2-amino-1.3-dibromoanthraquinone, 15.6 parts of 2-monomethylamino-1.3-dibromoanthraquinone, 12 parts of anhydrous sodium acetate, 6 parts of $Ca(OH)_2$, 0.5 parts of anhydrous copper chlorid are heated to boiling with 150 parts of naphthalene until the formation of the dye is completed. The dye is filtered off, washed with naphtha, alcohol and hot hydrochloric acid and hot water. The dye thus obtained possesses the remarkable property of dyeing full and deep shades even from a cold vat, while the known indanthrenes are only capable of dyeing from a warm vat. This property renders it possible to use this dye in conjunction with other vat dyes *e. g.* with the benzoylaminoanthraquinones and enables the dyer to produce a large variety of fast shades.

10 kilos of a 10 per cent. paste of dibromomethylindanthrene (see example) are mixed with 40 liters of water of 40° C., 4 liters caustic soda lye (30° Bé.) and 30 liters of hydrosulfite (17° Bé.) are added. The mixture is well stirred until the color is dissolved, which requires about 20 minutes. This solution is passed through a sieve into the dye-bath which consists of 1000 liters of cold water, to which ¼ liter of caustic soda lye (30° Bé.), 1 liter hydrosulfite solution (17° Bé.) and 40 kilos of common salt have been added. The bath is well stirred and 50 kilos of cotton yarn after having been well wetted out are entered. The cotton is worked for ¾ to 1 hour in the cold. After dyeing the goods are squeezed out, well exposed, rinsed, acidulated with a solution containing 1–2 cubic centimeters of sulfuric acid (66° B.) in 1 liter of water, rinsed and soaped at the boil. A very fast even blue results.

Wool and silk are dyed in an analogous manner at about 30–40° C.

I claim:—

The herein described new dyestuff being a hydroazin derivative of the anthracene series, having probably the formula:

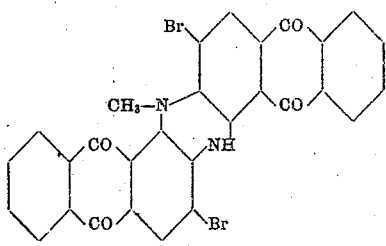

which dyestuff crystallizes in dark blue needles, difficultly soluble with a blue color in nitrobenzene, soluble in concentrated sulfuric acid with a brown color; dyeing the fiber from a hydrosulfite vat in blue shades, substantially as described.

In testimony whereof I have hereunto set my hand in the presence of two subscribing witnesses.

MAX KUGEL. [L. S.]

Witnesses:
ALFRED HENKEL,
WALTER VONNEGUT.